US011323555B2

(12) United States Patent
Wang

(10) Patent No.: US 11,323,555 B2
(45) Date of Patent: May 3, 2022

(54) COMPOSITE BUTTON AND PROTECTIVE CASE HAVING THE SAME

(71) Applicant: EVOLUTIVE LABS CO., LTD., Taipei (TW)

(72) Inventor: Ching-Fu Wang, Taichung (TW)

(73) Assignee: Evolutive Labs Co., Ltd., Taipei (TW)

( * ) Notice: Subject to any disclaimer, the term of this patent is extended or adjusted under 35 U.S.C. 154(b) by 83 days.

(21) Appl. No.: 16/821,788

(22) Filed: Mar. 17, 2020

(65) Prior Publication Data

US 2020/0304620 A1 Sep. 24, 2020

(30) Foreign Application Priority Data

Mar. 19, 2019 (TW) ................................ 108109350

(51) Int. Cl.
| | | |
|---|---|---|
| *H04M 1/23* | (2006.01) | |
| *A45C 11/00* | (2006.01) | |
| *H04M 1/02* | (2006.01) | |
| *H04M 1/18* | (2006.01) | |

(52) U.S. Cl.
CPC .............. *H04M 1/23* (2013.01); *A45C 11/00* (2013.01); *H04M 1/026* (2013.01); *H04M 1/185* (2013.01); *A45C 2011/002* (2013.01)

(58) Field of Classification Search
CPC ........ H04M 1/23; H04M 1/026; H04M 1/185; A45C 11/00; A45C 2011/002; H04B 1/3888
See application file for complete search history.

(56) References Cited

U.S. PATENT DOCUMENTS

| 9,048,665 | B2 * | 6/2015 | Wojcik | H02J 4/00 |
| 9,204,697 | B2 * | 12/2015 | Yang | G06F 1/1626 |
| 9,498,033 | B2 * | 11/2016 | Richardson | H05K 5/0004 |
| 2004/0142749 | A1 * | 7/2004 | Ishimaru | G05G 9/047 |
| | | | | 463/37 |
| 2012/0314354 | A1 * | 12/2012 | Rayner | H05K 5/0017 |
| | | | | 361/679.01 |

(Continued)

FOREIGN PATENT DOCUMENTS

| CN | 2468148 Y | 12/2001 |
| CN | 204117905 U | 1/2015 |

(Continued)

OTHER PUBLICATIONS

Search Report issued to European counterpart application No. 20163856.6 by the EPO dated Aug. 25, 2020.

(Continued)

*Primary Examiner* — Lewis G West
(74) *Attorney, Agent, or Firm* — Burris Law, PLLC

(57) ABSTRACT

A composite button is configured to be inserted into a button hole of a protective case for contacting a trigger button of an electronic device. The protective case includes a casing peripheral wall having an inner peripheral surface. The composite button includes a soft material layer having a contact surface suitable for contacting the trigger button, and a soft material connecting surface opposite to said contact surface. A hard material layer is connected to said soft material connecting surface. At least one of the soft and hard material layers has a peripheral flange suitable for abutting against the inner peripheral surface of the casing peripheral wall.

20 Claims, 17 Drawing Sheets

(56) References Cited

U.S. PATENT DOCUMENTS

| | | | |
|---|---|---|---|
| 2013/0082963 A1 | 4/2013 | Chu | |
| 2018/0063611 A1* | 3/2018 | Hart | H04R 1/025 |
| 2021/0142656 A1* | 5/2021 | Liu | H01H 21/24 |
| 2021/0196892 A1* | 7/2021 | Dasbach | A61M 5/3158 |

FOREIGN PATENT DOCUMENTS

| | | |
|---|---|---|
| CN | 207399314 | 5/2018 |
| CN | 108878198 A | 11/2018 |
| JP | 2006171451 A | 6/2006 |

OTHER PUBLICATIONS

Search Report appended to an Office Action, which was issued to Chinese counterpart application No. 202010189921.2 by the CNIPA dated Jan. 6, 2021, with an English translation thereof.

Search Report appended to an Office Action, which was issued to Taiwanese counterpart application No. 108109350 by the TIPO dated Nov. 12, 2019, with an English translation thereof.

\* cited by examiner

COMPOSITE BUTTON AND PROTECTIVE CASE HAVING THE SAME

CROSS-REFERENCE TO RELATED APPLICATION

This application claims priority from Taiwanese Patent Application No. 108109350, filed on Mar. 19, 2019.

FIELD

The disclosure relates to a composite button and a protective case having the same.

BACKGROUND

Referring to FIG. 1, a protective case 1, as disclosed in Chinese Patent Publication No. 207399314, includes a housing 11, and at least one button 12 disposed on the housing 11. Through the button 12, a corresponding button (not shown) on a mobile phone (not shown) can be pressed. However, since the button 12 is a one-piece design and is usually made of hard plastic, it may be easily and accidentally touched to press a corresponding button on the mobile phone by an external force, for example, when stuffing the mobile phone inside a pocket or when holding the mobile phone by hand. Further, because the button 12 is made of a hard material, it may scratch the button on the mobile phone, thereby losing its protective function. Moreover, if the button 12 is made of a soft plastic material, although it can reduce the chance of being accidentally touched by an external force due to its flexible deformation, the soft button 12 is easily distorted due to shift in the direction of pressure, so that the pressing of the corresponding button on the mobile phone is poor. Additionally, the soft button 12 is easily adhered with dirt, especially when there is hand sweat.

SUMMARY

Therefore, an object of the present disclosure is to provide a composite button that is capable of alleviating at least one of the drawbacks of the prior art.

According to one aspect of this disclosure, a composite button is configured to be inserted into a button hole of a protective case, and is suitable for contacting a trigger button of an electronic device. The protective case includes a casing peripheral wall having an inner peripheral surface suitable for facing the electronic device, and an outer peripheral surface opposite to the inner peripheral surface. The button hole extends through the inner and outer peripheral surfaces. The composite button includes a soft material layer and a hard material layer. The soft material layer is made of a material that is elastoplastic, and has a contact surface suitable for contacting the trigger button of the electronic device, and a soft material connecting surface opposite to the contact surface. The hard material layer is connected to said soft material connecting surface. At least one of the soft material layer and the hard material layer has a peripheral flange suitable for abutting against the inner peripheral surface of the casing peripheral wall.

Another object of this disclosure is provide a protective case having the aforesaid composite button.

According to another aspect of this disclosure, a protective case is suitable for protecting an electronic device having a trigger button, and includes a casing peripheral wall and a composite button. The casing peripheral wall has an inner peripheral surface suitable for facing the electronic device, an outer peripheral surface opposite to the inner peripheral surface, and a button hole extending through the inner and outer peripheral surfaces. The composite button is inserted into the button hole, and includes a soft material layer and a hard material layer. The soft material layer is made of a material that is elastoplastic, and has a contact surface suitable for contacting the trigger button of the electronic device, and a soft material connecting surface opposite to the contact surface. The hard material layer is connected to said soft material connecting surface. At least one of the soft material layer and the hard material layer has a peripheral flange suitable for abutting against the inner peripheral surface of the casing peripheral wall.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
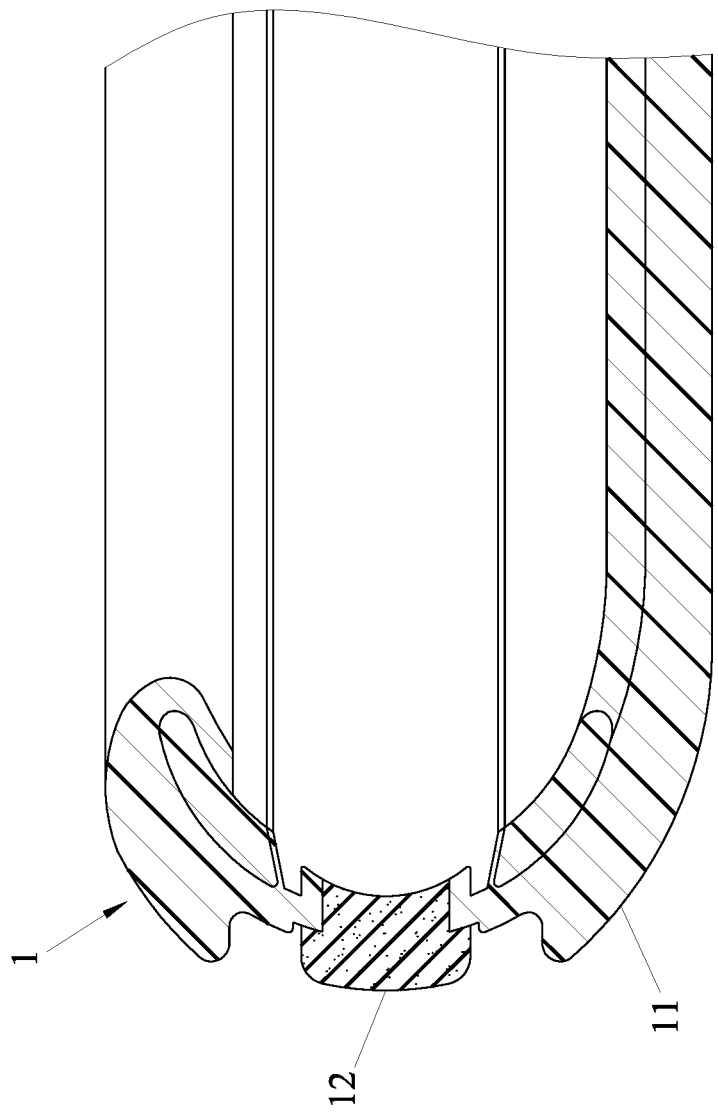
FIG. 1 is a fragmentary sectional view of a protective case disclosed in Chinese Patent Publication No. 207399314.

Before the present disclosure is described in greater detail, it should be noted herein that like elements are denoted by the same reference numerals throughout the disclosure.

Figure 2:
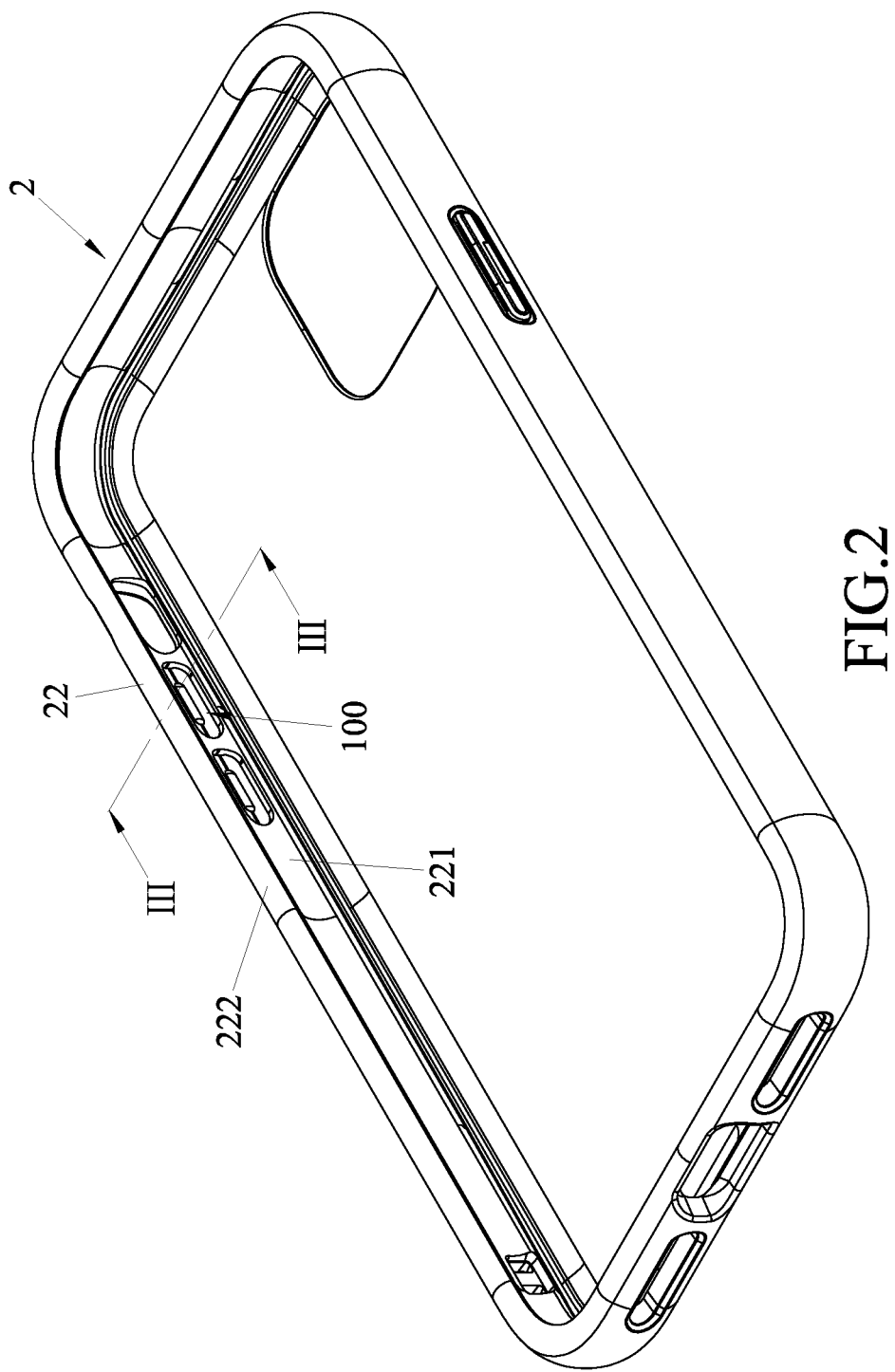
FIG. 2 is a perspective view of a protective case according to the first embodiment of the present disclosure.
Figure 3:
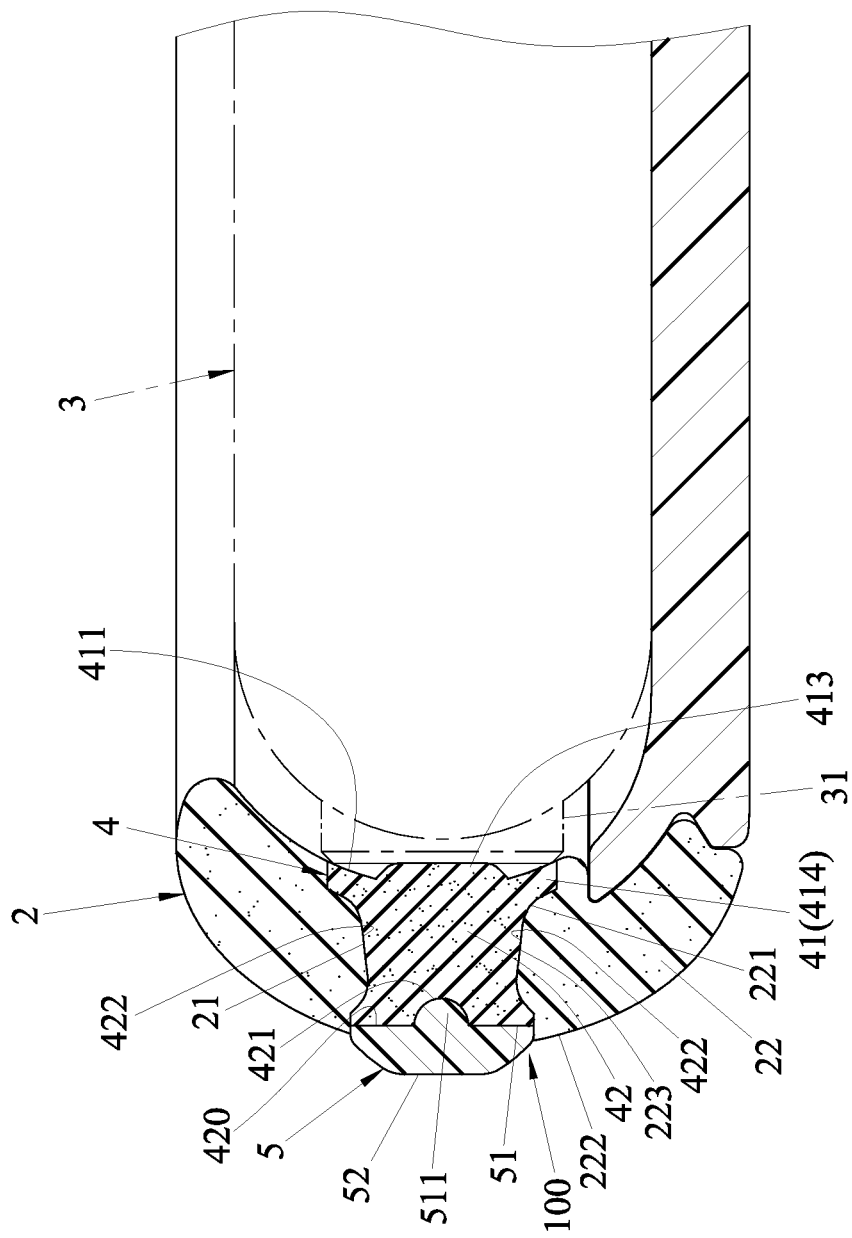
FIG. 3 is a sectional view of the first embodiment taken along line III-III of FIG. 2.

Referring to FIGS. 2 and 3, a protective case 2 according to the first embodiment of the present disclosure is suitable for protecting an electronic device 3 which has a trigger button 31. The electronic device 3 is exemplified in this embodiment as a handheld device, such as a mobile phone. The protective case 2 includes a casing peripheral wall 22 and a composite button 100. The casing peripheral wall 22 has an inner peripheral surface 221 suitable for facing the electronic device 3, an outer peripheral surface 222 opposite to the inner peripheral surface 221, and a button hole 21 extending through the inner and outer peripheral surfaces 221, 222. The button hole 21 is defined by a hole-defining wall 223.

Figure 4:
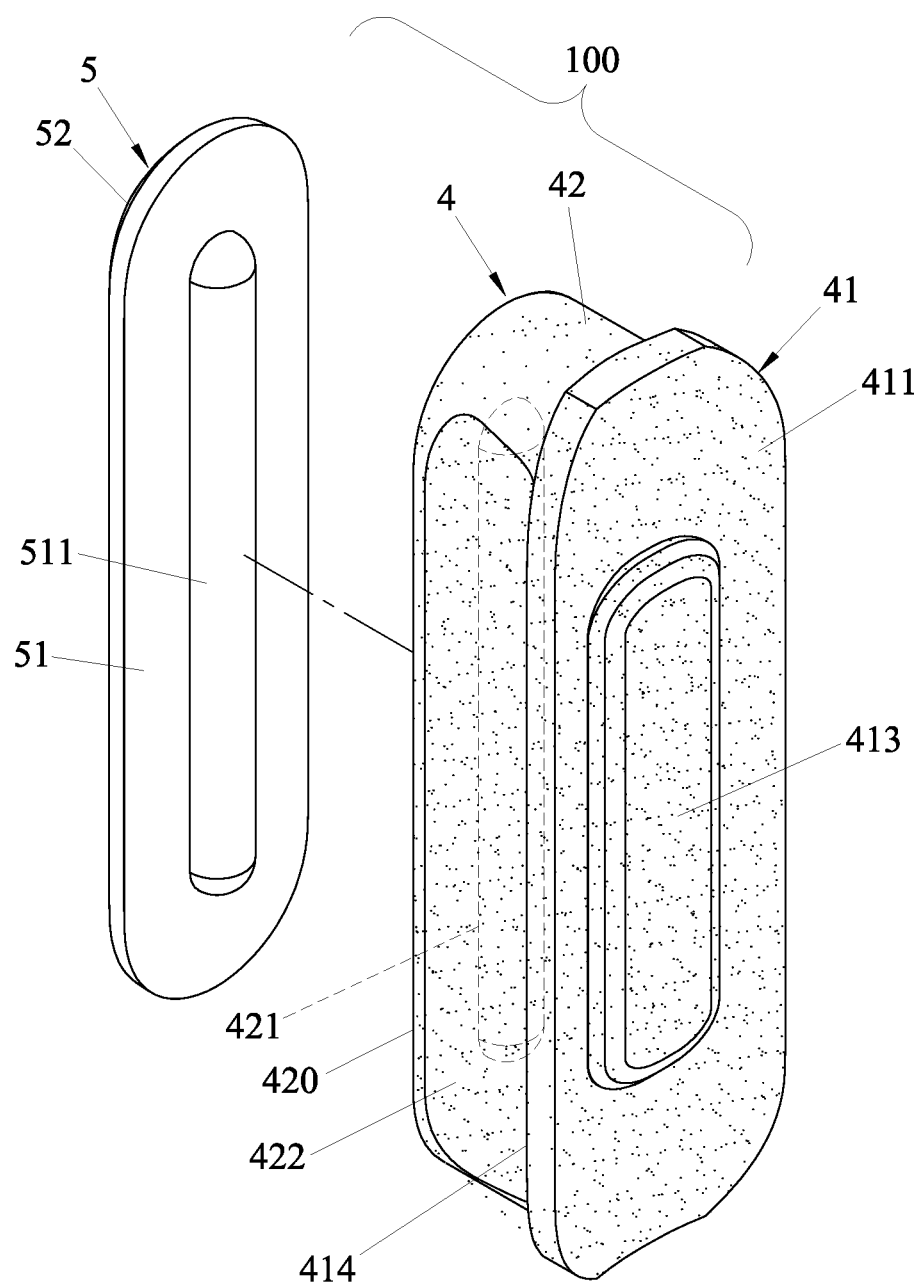
FIG. 4 is an exploded perspective view of a composite button of the first embodiment.
Figure 5:
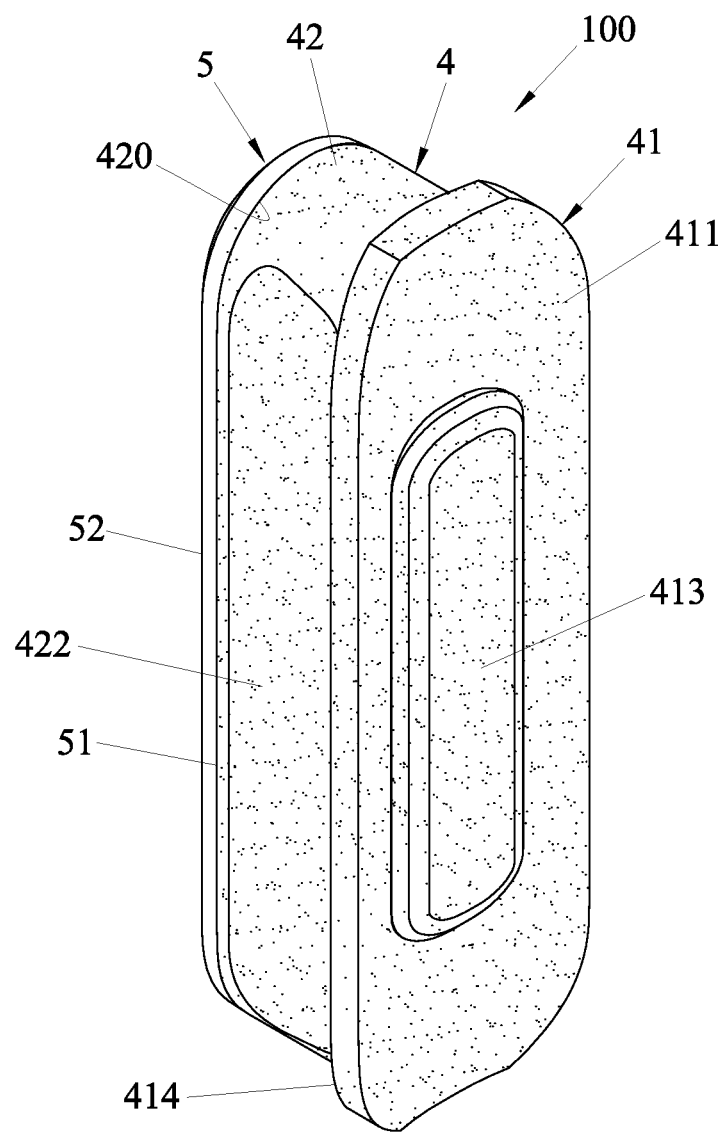
FIG. 5 is an assembled perspective view of FIG. 4.

Referring to FIGS. 4 and 5, in combination with FIG. 3, the composite button 100 is elongated, and includes a soft material layer 4 and a hard material layer 5. The soft material layer 4 is made of a material that is elastoplastic, such as plastic, rubber, silicone or a combination thereof. In this embodiment, the soft material layer 4 is inserted into the button hole 21 of the protective case 2, and includes a contact portion 41 suitable for contacting the trigger button 31, and a mounting portion 42 opposite to the contact portion 41. The contact portion 41 has a contact surface 411 suitable for facing the electronic device 3, and a peripheral flange 414 extending outwardly therefrom and configured to abut against the inner peripheral surface 221 of the casing peripheral wall 22. The contact surface 411 has a protruding rib 413 protruding therefrom for contacting the trigger button 31.

In this embodiment, the mounting portion 42 extends opposite to the contact surface 411 of the contact portion 41, and has a soft material connecting surface 420 opposite to the contact surface 411, a first connecting area 421 formed on the soft material connecting surface 420, and two connecting slots 422 formed in two opposite sides of an outer peripheral surface thereof and located between the soft material connecting surface 420 and the contact portion 41. In this embodiment, the first connecting area 421 is a recess, and the connecting slots 422 abut against the hole-defining wall 223.

Figure 6:
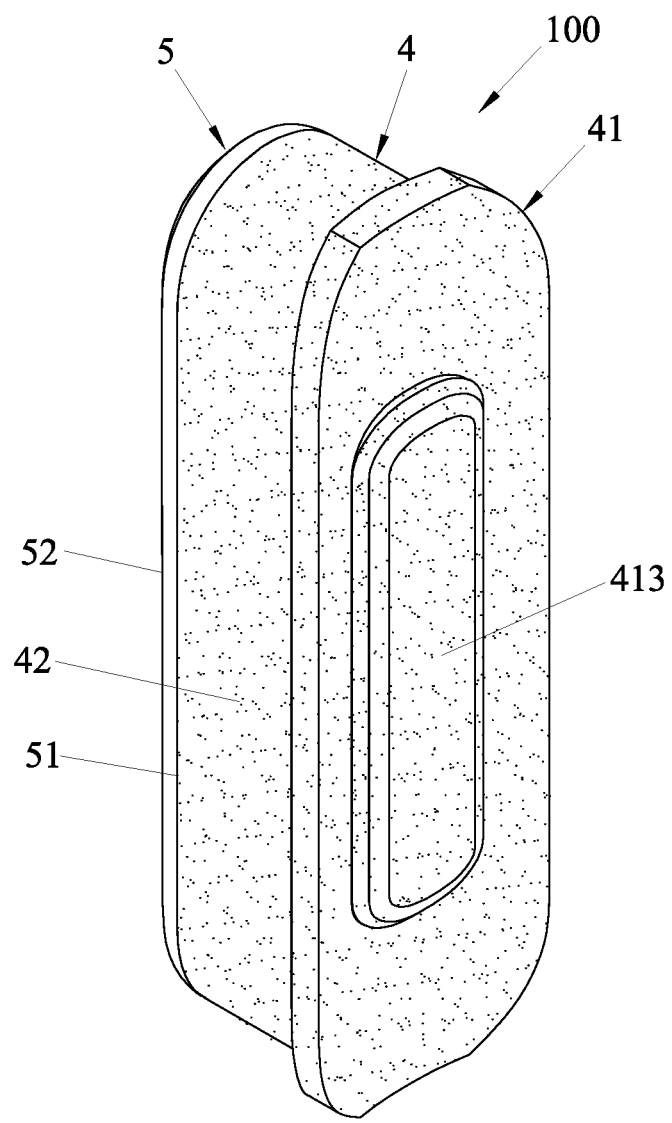
FIG. 6 is an alternative form of the composite button of the first embodiment.

It should be noted herein that the first connecting area 421 is not limited to a recess. In other variations of this embodiment, it may be a blind hole, or a through hole that extends from the soft material connecting surface 420 to the contact surface 411 of the contact portion 41. Further, the outer peripheral surface of the mounting portion 42 is not limited to being formed with the connecting slots 422. In other variations of this embodiment, it may be dispensed with the connecting slots, as shown in FIG. 6, and may be directly inserted into the button hole 21.

The hard material layer 5 may be made of metal or plastic, and has a hard material connecting surface 51 connected to the soft material connecting surface 420, and a touch surface 52 opposite to the hard material connecting surface 51. The hard material connecting surface 51 has a second connecting area 511 embedded in the first connecting area 421. In this embodiment, the second connecting area 511 is a protrusion that matches the recess or a blind hole or a through hole of the first connecting area 421 and that may extend to an appropriate length, so that a connecting strength with the first connecting area 421 may be enhanced. In this embodiment, the touch surface 52 is a curved surface that protrude out of the outer peripheral surface 222 and that is configured to be pressed by a user.

It should be noted that the second connecting area 511 is not limited to a protrusion. In other variations of this embodiment, the second connecting area 511 may be a recess, in which case the first connecting area 421 is a protrusion. Further, the color of the hard material layer 5 is not limited to being the same as that of the soft material layer 4. In other variations of this embodiment, the color of the hard material layer 5 may be different from that of the soft material layer 4. Moreover, when the hard material layer 5 and the soft material layer 4 are both made of plastic, the hard material layer 5 is first injection molded, and when the hard material layer 5 is slightly cooled and solidified, the soft material layer 4 is then injection molded onto the hard material layer 5. After the soft material layer 4 and the hard material layer 5 are cooled, they are connected as one piece.

To assemble the composite button 100 to the protective case 2, the soft material layer 4 is simply inserted into the button hole 21 of the protective case 2 from the inner peripheral surface 221 of the casing peripheral wall 22 toward the outer peripheral surface 222 thereof such that the mounting portion 42 is received in the button hole 21 and the touch surface 52 of the hard material layer 5 extends out of the outer peripheral surface 222 of the casing peripheral wall 22. At this time, the peripheral flange 414 abuts against the inner peripheral surface 221 of the casing peripheral wall 22, and the protruding rib 413 contacts the trigger button 31. Through this, the composite button 100 of this disclosure can be used to press against the trigger button 31 of the electronic device 3.

It is worth to mention herein that the soft and deformable protruding rib 413 may be used to eliminate a gap between the trigger button 31 and the contact portion 41, thereby ensuring that the contact portion 41 can indeed act on the trigger button 31.

In use, it is only necessary to press the touch surface 52 of the hard material layer 5 so that the hard material layer 5 can act on and force the soft material layer 4 to deform until the protruding rib 413 contacts the trigger button 31, thereby achieving the purpose of triggering.

Importantly, when an external force accidentally touches the composite button 100, the soft material layer 4 can absorb the external force because of its elastoplasticity. At this time, since the amount of deformation of the soft material layer 4 is not enough to press the trigger button 31, accidental touching of the trigger button 31 can be avoided.

Figure 7:
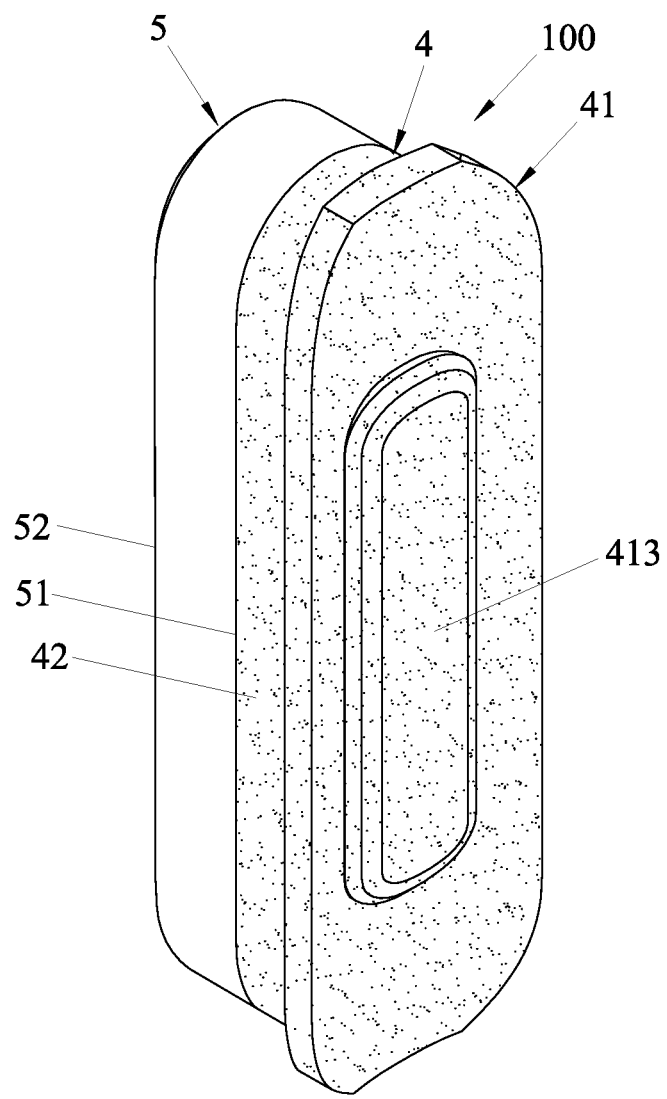
FIG. 7 is another alternative form of the composite button of the first embodiment.
Figure 8:
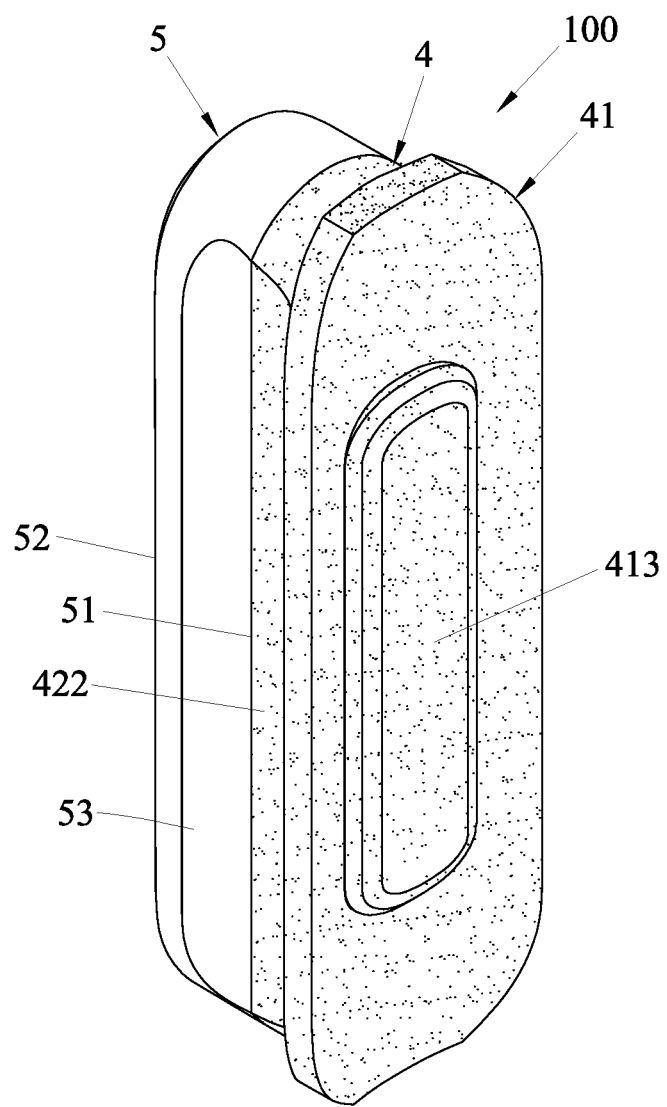
FIG. 8 is yet another alternative form of the composite button of the first embodiment.

It should be noted that the thickness of the mounting portion 42 is not limited to being greater than that of the hard material layer 5. In other variations of this embodiment, the thickness ratio of the mounting portion 42 and the hard material layer 5 may be 1:1, as shown in FIGS. 7 and 8, or other thickness ratios. Through this, the soft material layer 4, or the hard material layer 5, or the soft and hard material layers 4, 5 may be inserted into the button hole 21, as shown in FIG. 3.

Further, two opposite sides of an outer peripheral surface of the hard material layer 5 are not limited to being flat, as shown in FIG. 7. In other variations of this embodiment, as shown in FIG. 8, the hard material layer 5 may further include two connecting slots 53 formed in the two opposite sides of the outer peripheral surface thereof and respectively adjacent to the connecting slots 422, so that the connecting slots 53 and the connecting slots 422 can abut against the hole-defining wall 223.

Figure 9:
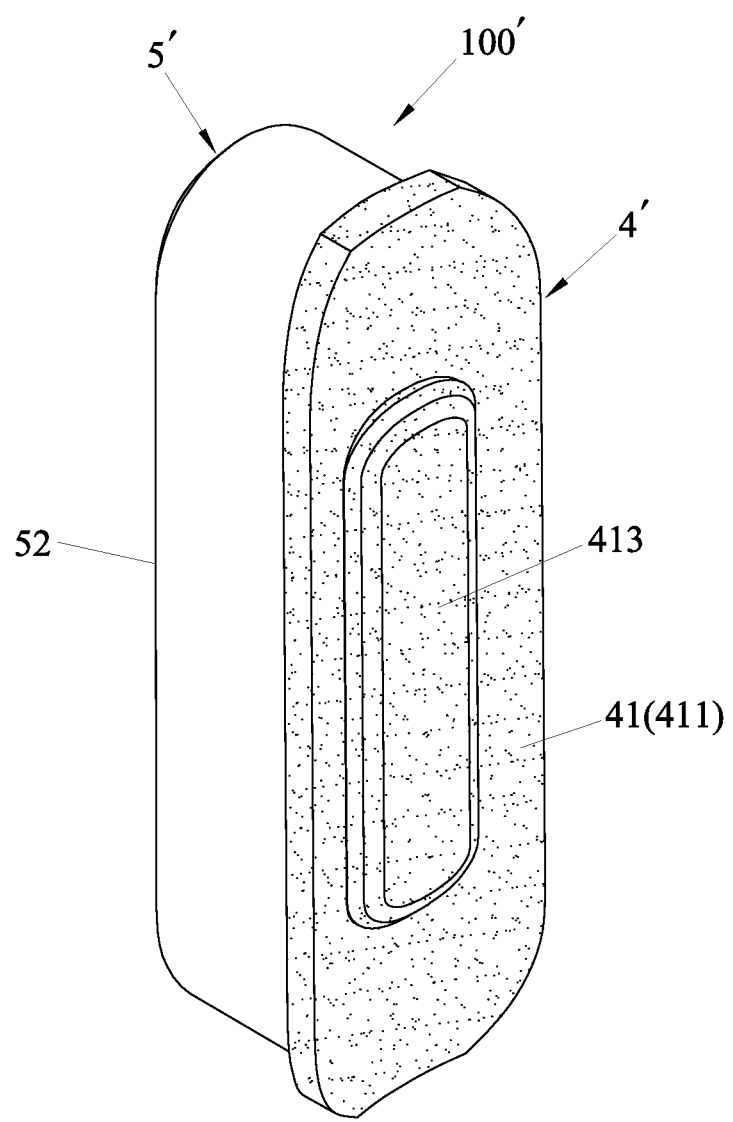
FIG. 9 is a perspective view of the second embodiment of the composite button.
Figure 10:
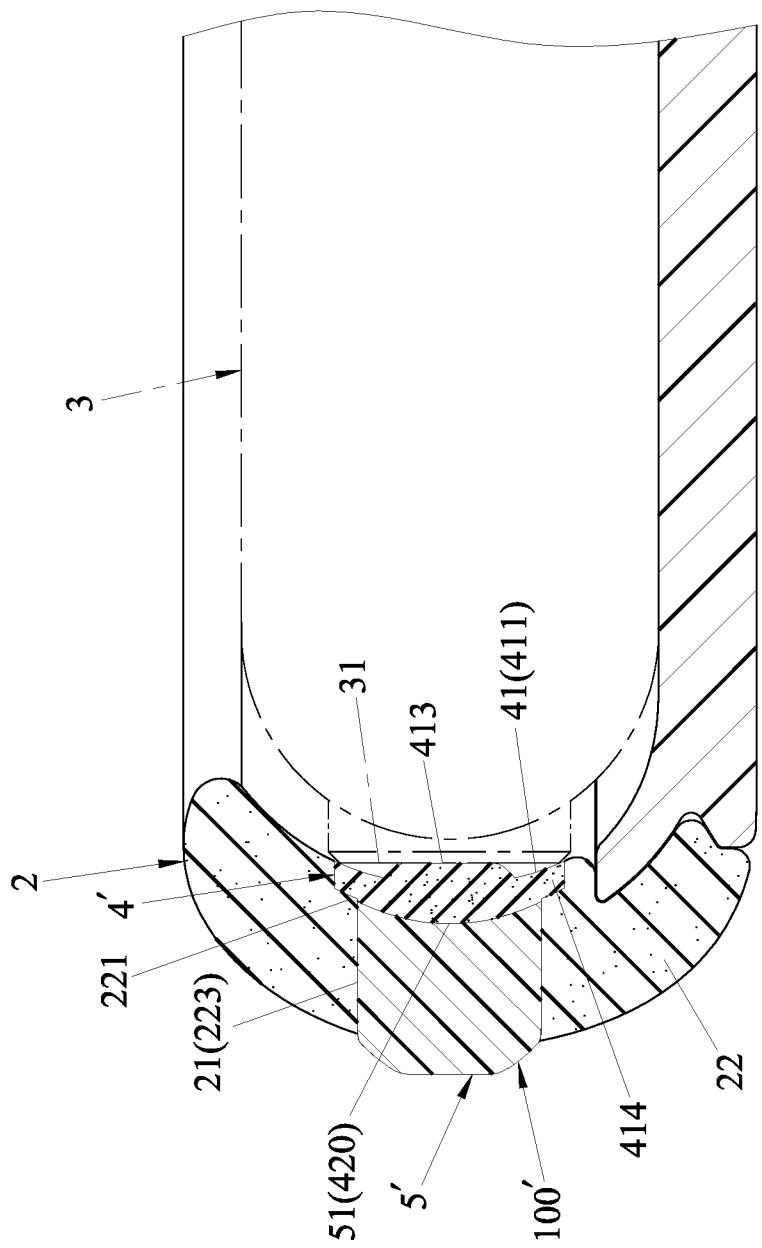
FIG. 10 is a fragmentary sectional view, illustrating how the composite button of the second embodiment is mounted on the protective case.

Referring to FIGS. 9 and 10, the second embodiment of the composite button 100' of the protective case 2 of this disclosure is substantially identical to the first embodiment. Particularly, the composite button 100' includes the soft material layer 4' and the hard material layer 5'. The difference between the first and second embodiments resides in that the soft material layer 4' only includes the contact portion 41. In this case, the contact portion 41 has the contact surface 411, the peripheral flange 414, and the soft material connecting surface 420. Further, the hard material layer 5' extends from the soft material connecting surface 420 in a direction away from the contact surface 411.

During assembly, the hard material layer 5' is inserted into the button hole 21 of the casing peripheral wall 22 until the peripheral flange 414 abuts against the inner peripheral surface 221 of the casing peripheral wall 22, and the protruding rib 413 of the soft material layer 4' contacts the trigger button 31 of the electronic device 3.

Figure 11:
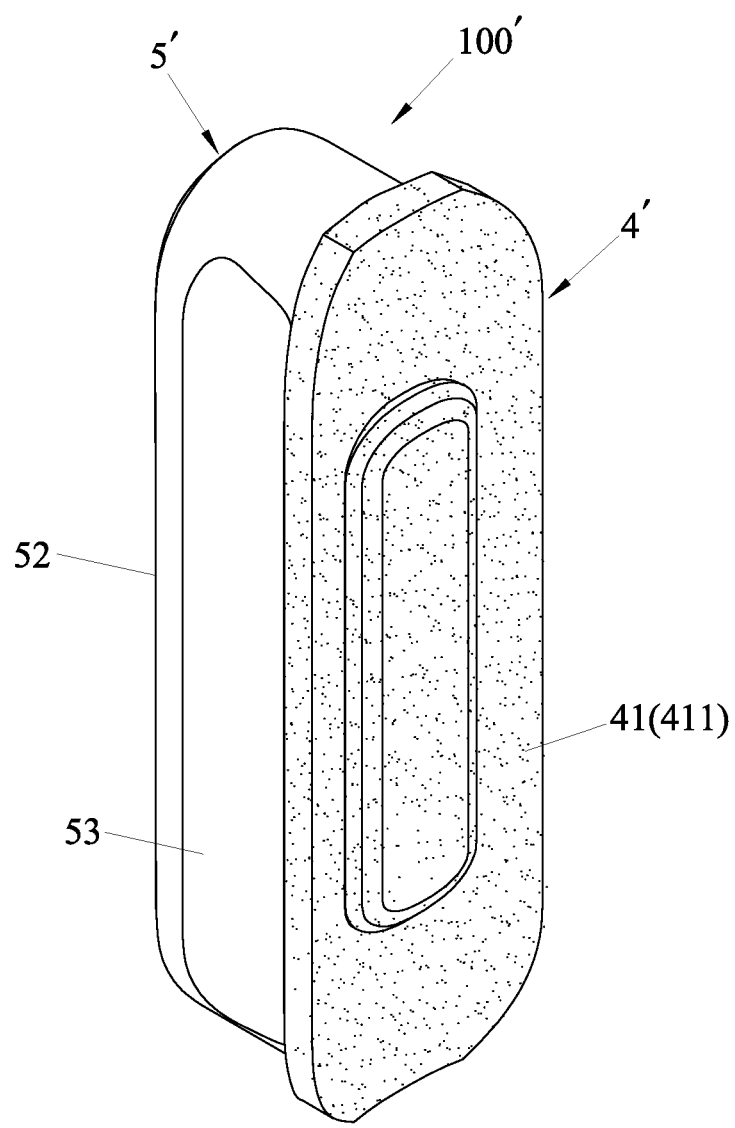
FIG. 11 is an alternative form of the composite button of the second embodiment.

In this embodiment, the two opposite sides of the outer peripheral surface of the hard material layer 5' are flat. In other variations of this embodiment, as shown in FIG. 11, the hard material layer 5' may further include two connecting slots 53 formed in the two opposite sides of the outer peripheral surface thereof for abutting against the hole-defining wall 223 (see FIG. 10).

Figure 12:
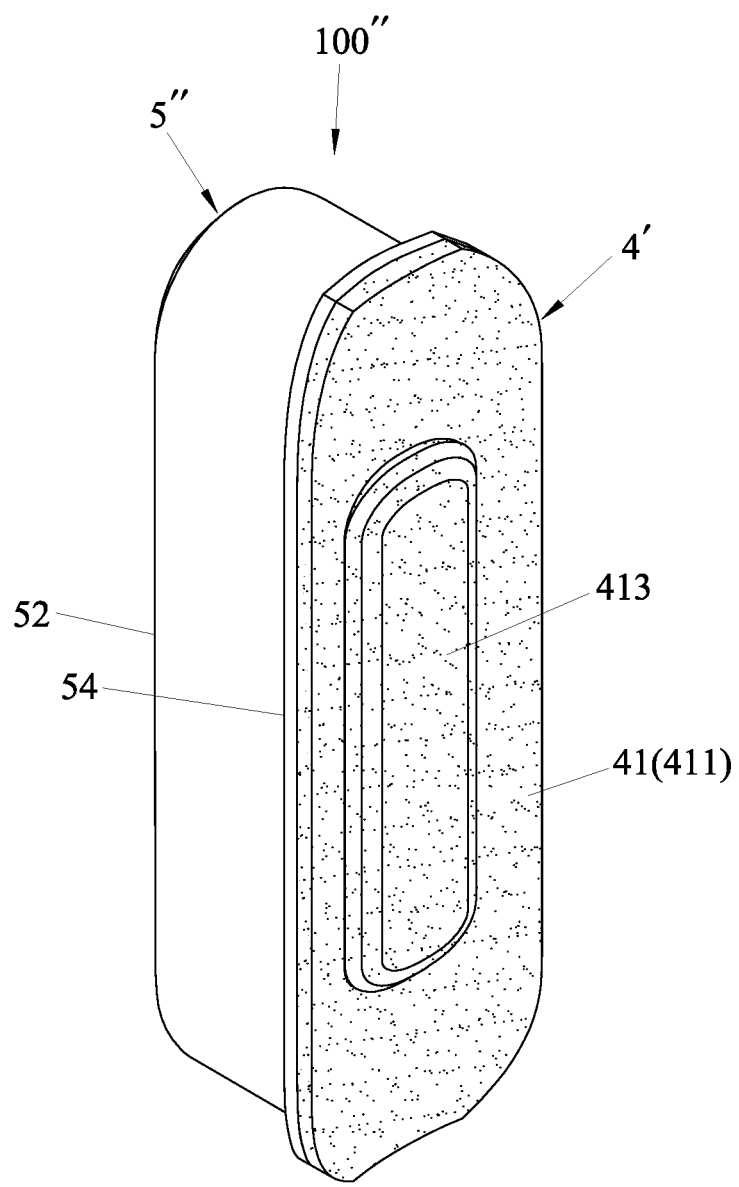
FIG. 12 is a perspective view of the third embodiment of the composite button.
Figure 13:
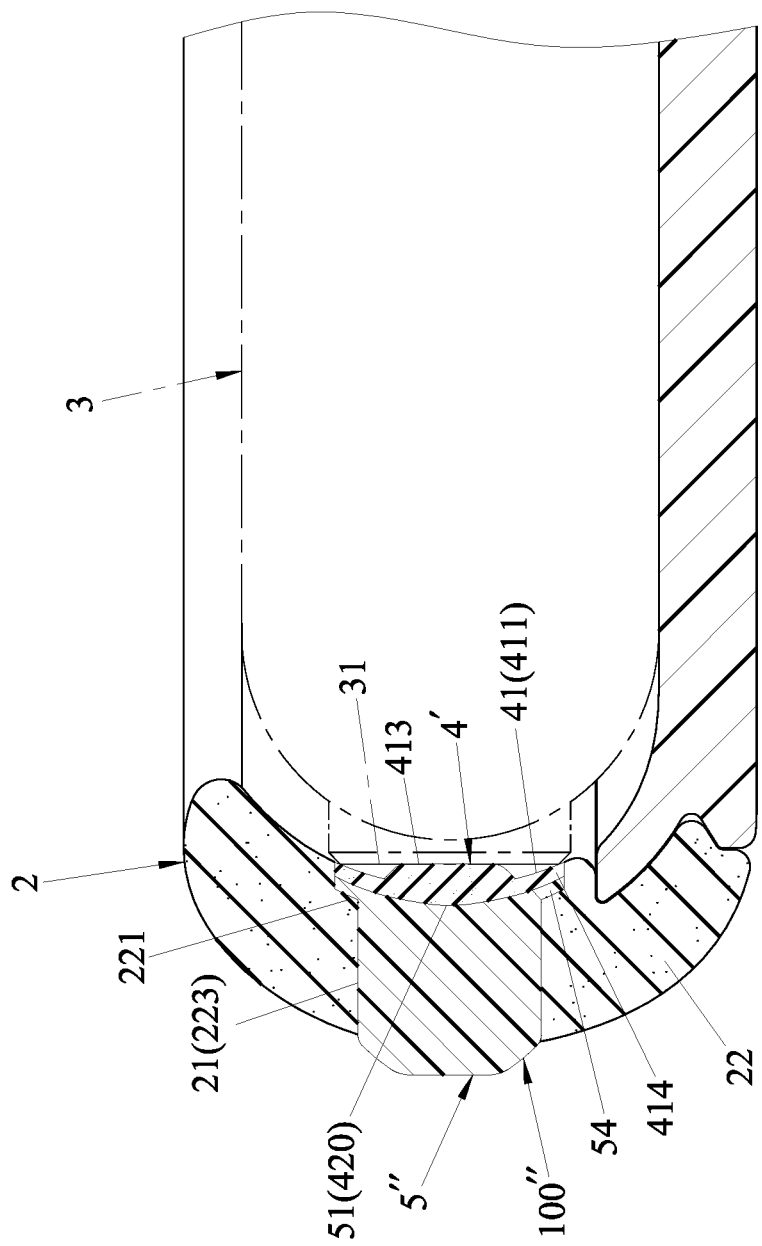
FIG. 13 is a fragmentary sectional view, illustrating how the composite button of the third embodiment is mounted on the protective case.

Referring to FIGS. 12 and 13, the third embodiment of the composite button 100" of the protective case 2 of this disclosure is substantially identical to the second embodiment, and differs in that the hard material layer 5" further has a peripheral flange 54 extending outwardly and integrally from an outer peripheral edge of the hard material connecting surface 51. The peripheral flange 54 and the peripheral flange 414 are configured to abut against the inner peripheral surface 221 of the casing peripheral wall 22.

During assembly, similarly, the hard material layer 5" is inserted into the button hole 21 of the casing peripheral wall 22 until the peripheral flange 54 and the peripheral flange 414 abut against the inner peripheral surface 221 of the casing peripheral wall 22, and the protruding rib 413 of the soft material layer 4' contacts the trigger button 31 of the electronic device 3.

Figure 14:
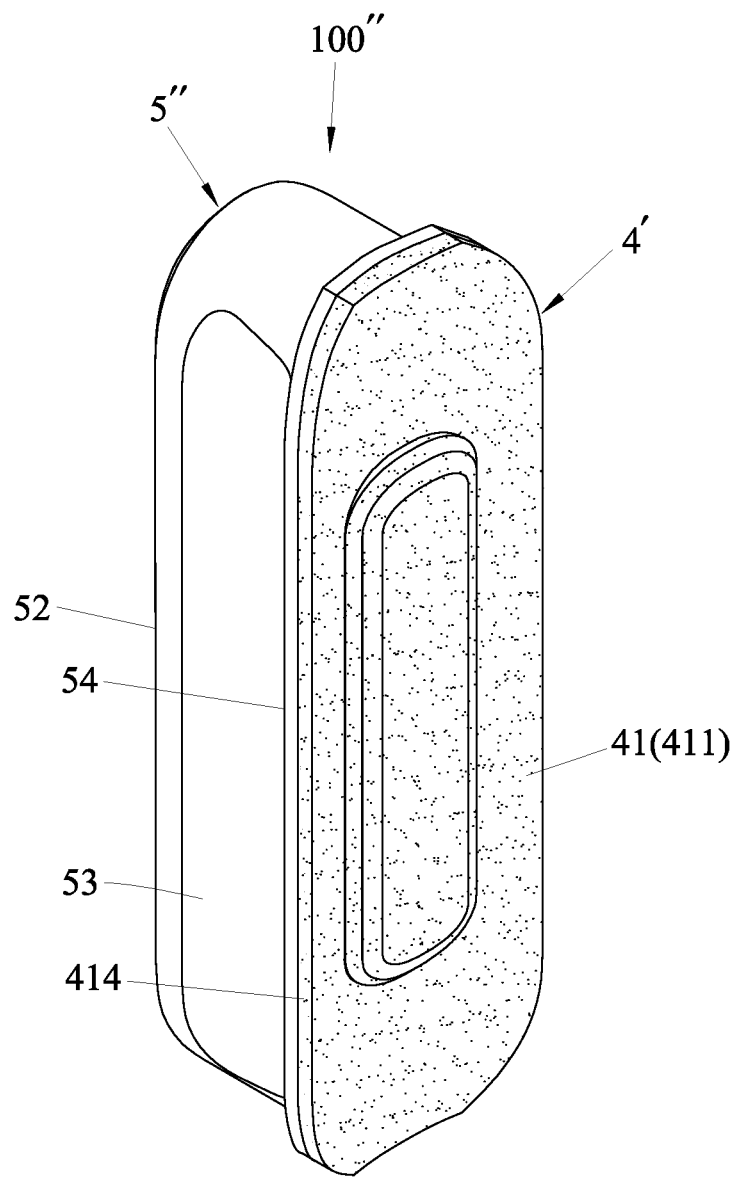
FIG. 14 is an alternative form of the composite button of the third embodiment.

The two opposite sides of the outer peripheral surface of the hard material layer 5" are not limited to being flat, as shown in FIG. 12. In other variations of this embodiment, as shown in FIG. 14, the hard material layer 5" may further include two connecting slots 53 formed in the two opposite sides of the outer peripheral surface thereof for abutting against the hole-defining wall 223 (see FIG. 13).

Figure 15:
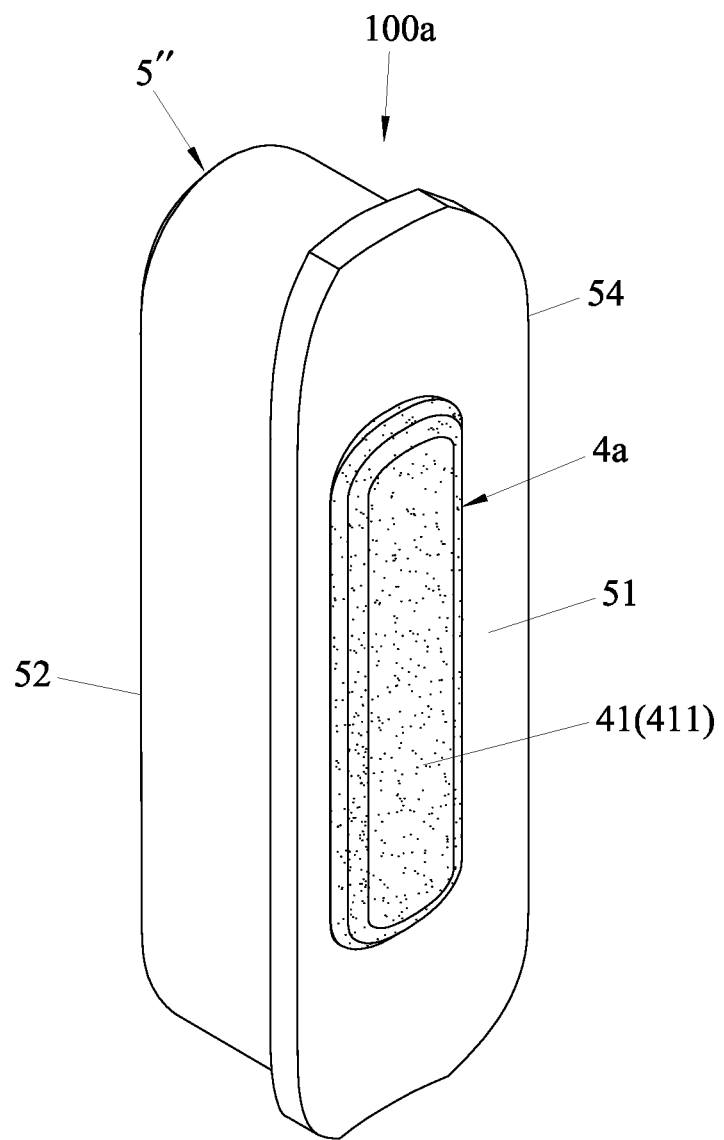
FIG. 15 is a perspective view of the fourth embodiment of the composite button.
Figure 16:
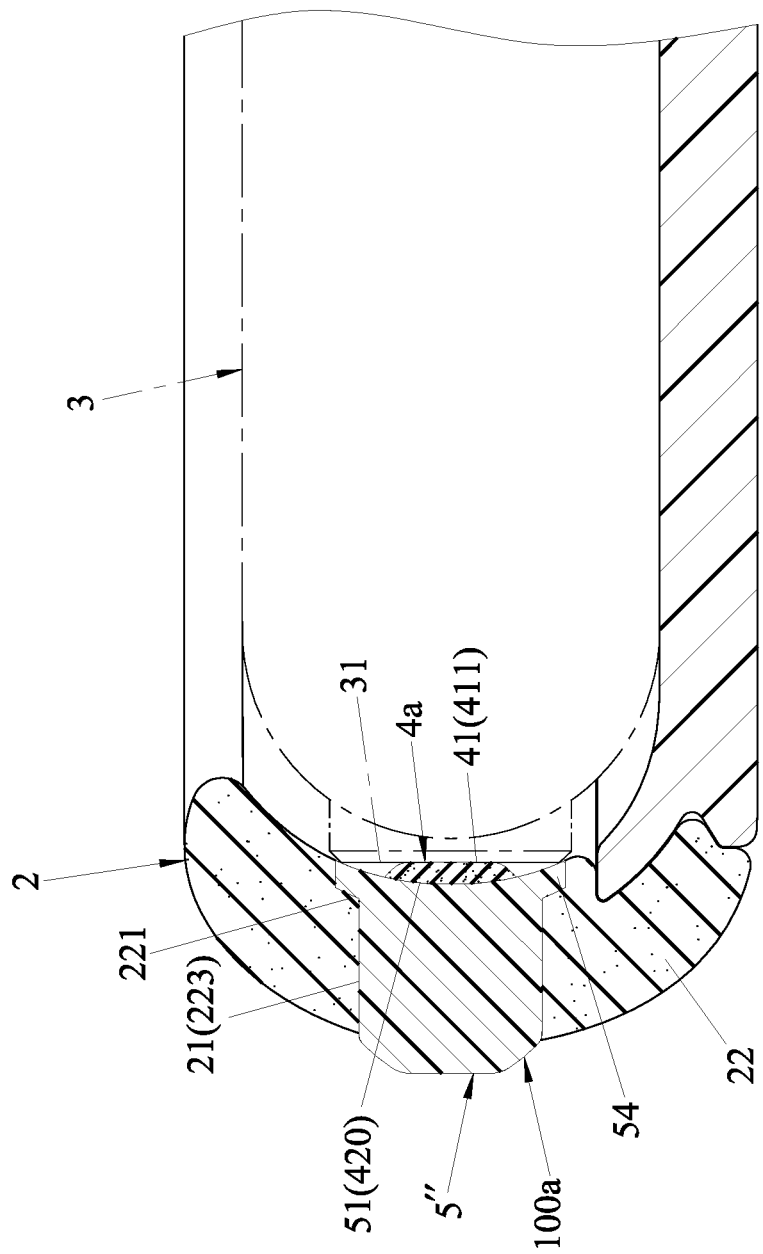
FIG. 16 is a fragmentary sectional view, illustrating how the composite button of the fourth embodiment is mounted on the protective case.

Referring to FIGS. 15 and 16, the fourth embodiment of the composite button (100a) of the protective case 2 of this disclosure is substantially identical to the third embodiment. However, in this embodiment, the soft material layer (4a) is disposed on the connecting surface 51 of the hard material layer 5", and has an area smaller than that of the connecting surface 51. Further, the soft material layer (4a) only includes the contact portion 41, and the contact portion 41 has the contact surface 411, the peripheral flange 414, and the soft material connecting surface 420.

During assembly, the hard material layer 5" is inserted into the button hole 21 of the casing peripheral wall 22 until the peripheral flange 54 abuts against the inner peripheral surface 221 of the casing peripheral wall 22, and the contact surface 411 of the contact portion 41 of the soft material layer (4a) contacts the trigger button 31 of the electronic device 3.

Figure 17:
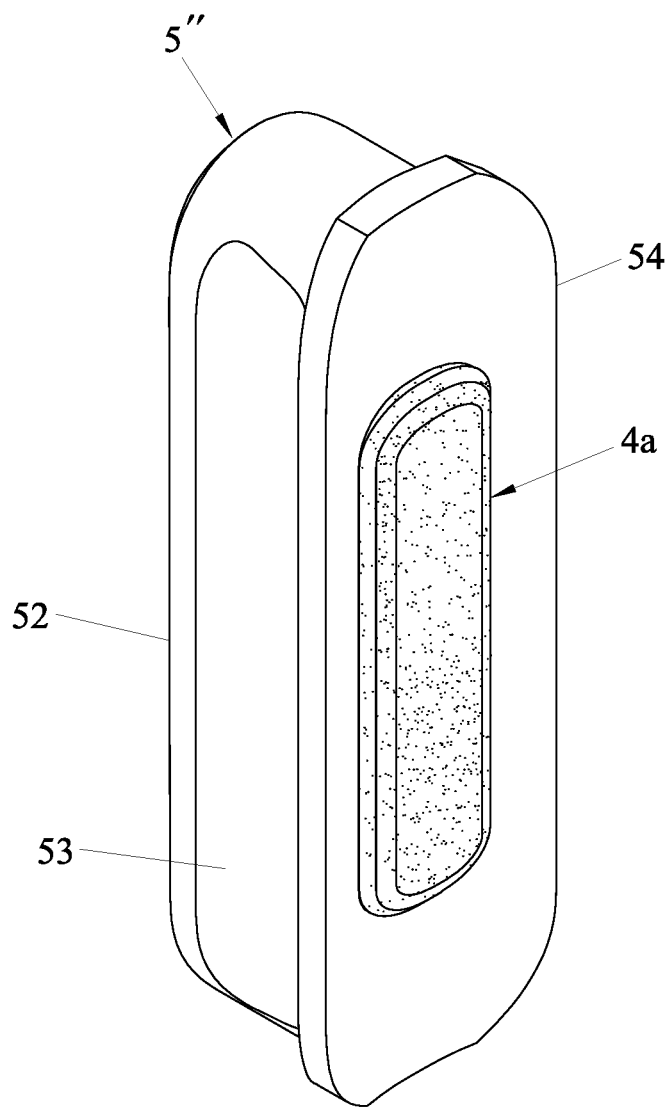
FIG. 17 is an alternative form of the composite button of the fourth embodiment.

The two opposite sides of the outer peripheral surface of the hard material layer 5" are not limited to being flat, as shown in FIG. 15. In other variations of this embodiment, as shown in FIG. 17, the hard material layer 5" may further include two connecting slots 53 formed in the two opposite sides of the outer peripheral surface thereof for abutting against the hole-defining wall 223 (see FIG. 16).

From the aforesaid description, the advantages of this disclosure can be summarized as follows:

1. When the touch surface 52 of the hard material layer 5, 5', 5" is accidentally touched by an external force, the soft material layer 4, 4', 4a can be used to absorb the external force due to its elastoplasticity, thereby preventing accidental pressing of the trigger button 31 of the electronic device 3.

2. The hard material layer 5, 5', 5" can spread the force during pressing, so that the pressing force can uniformly act on the soft material layer 4, 4', 4a. Thus, the feel when the soft material layer 4, 4', 4a is pressed against the trigger button 31 can be improved, and the pressing is smooth.

3. The soft material layer 4, 4', 4a and the hard material layer 5, 5', 5" may have the same or different color, and may be freely replaced with personal favorite colors, thereby enhancing the overall aesthetic effect.

4. The composite button 100, 100', 100", 100a has the hard material layer 5, 5', 5" located on an outer side thereof, and the soft material layer 4, 4', 4a located on an inner side thereof. Thus, the hard material layer 5, 5', 5" is not easily stick with sweat, dust or hair, and can be easily cleaned. The soft material layer 4, 4', 4a will not damage the trigger button 31, and can greatly improve the practicality of use.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite button configured to be inserted into a button hole of a protective case and suitable for contacting a trigger button of an electronic device, the protective case including a casing peripheral wall that has an inner peripheral surface suitable for facing the electronic device, and an outer peripheral surface opposite to the inner peripheral surface, the button hole extending through the inner and outer peripheral surfaces, said composite button comprising:
   a soft material layer made of a material that is elastoplastic and having a contact surface suitable for contacting the trigger button of the electronic device, and a soft material connecting surface opposite to said contact surface; and
   a hard material layer connected to said soft material connecting surface;
   wherein at least one of said soft material layer and said hard material layer has a peripheral flange suitable for abutting against the inner peripheral surface of the casing peripheral wall; and wherein the soft material layer is movable relative to the inner peripheral surface of the casing peripheral wall of the protective case.

2. The composite button as claimed in claim 1, wherein said soft material layer includes a contact portion having said contact surface.

3. The composite button as claimed in claim 2, wherein said hard material layer has a hard material connecting surface connected to said soft material connecting surface, and a touch surface opposite to said hard material connecting surface and configured to protrude out of the outer peripheral surface of the protective case.

4. The composite button as claimed in claim 3, wherein said contact portion of said soft material layer further has said peripheral flange extending outwardly therefrom.

5. The composite button as claimed in claim 3, wherein said soft material layer further includes a mounting portion opposite to said contact portion and having said soft material connecting surface, said mounting portion further having a first connecting area formed on said soft material connecting surface, said hard material connecting surface having a second connecting area connected to said first connecting area, and wherein one of said first and second connecting areas is a recess, and the other one of said first and second connecting areas is a protrusion.

6. The composite button as claimed in claim 2, wherein said mounting portion extends opposite to said contact surface of said contact portion.

7. The composite button as claimed in claim 2, wherein said contact surface of said contact portion has at least one protruding rib protruding therefrom and suitable for contacting the trigger button.

8. The composite button as claimed in claim 3, wherein said hard material layer has said peripheral flange, and said peripheral flange extends outwardly and integrally from an outer peripheral edge of said hard material connecting surface.

9. The composite button as claimed in claim 1, wherein the button hole of the protective case is defined by a hole-defining wall, and at least one of said soft material layer and said hard material layer further has at least one connecting slot formed in an outer peripheral surface thereof and suitable for abutting against the hole-defining wall.

10. The composite button as claimed in claim 1, wherein said hard material layer has a color different from that of said soft material layer.

11. A protective case suitable for protecting an electronic device which has a trigger button, said protective case comprising:
a casing peripheral wall having an inner peripheral surface suitable for facing the electronic device, an outer peripheral surface opposite to said inner peripheral surface, and a button hole extending through said inner and outer peripheral surfaces; and
a composite button inserted into said button hole and including a soft material layer and a hard material layer, said soft material layer being made of a material that is elastoplastic, and having a contact surface suitable for contacting the trigger button of the electronic device, and a soft material connecting surface opposite to said contact surface, said hard material layer being connected to said soft material connecting surface;
wherein at least one of said soft material layer and said hard material layer has a peripheral flange suitable for abutting against the inner peripheral surface of the casing peripheral wall; and
wherein the soft material layer is movable relative to the inner peripheral surface of the casing peripheral wall.

12. The protective case as claimed in claim 11, wherein said soft material layer includes a contact portion having said contact surface.

13. The protective case as claimed in claim 12, wherein said hard material layer has a hard material connecting surface connected to said soft material connecting surface, and a touch surface opposite to said hard material connecting surface and protruding out of said outer peripheral surface of said protective case.

14. The protective case as claimed in claim 13, wherein said contact portion of said soft material layer further has said peripheral flange extending outwardly therefrom.

15. The protective case as claimed in claim 13, wherein said soft material layer further includes a mounting portion opposite to said contact portion and having said soft material connecting surface, said mounting portion further having a first connecting area formed on said soft material connecting surface, said hard material connecting surface having a second connecting area connected to said first connecting area, and wherein one of said first and second connecting areas is a recess, and the other one of said first and second connecting areas is a protrusion.

16. The protective case as claimed in claim 12, wherein said mounting portion extends opposite to said contact surface of said contact portion.

17. The composite button as claimed in claim 12, wherein said contact surface of said contact portion has at least one protruding rib protruding therefrom and suitable for contacting the trigger button.

18. The protective case as claimed in claim 13, wherein said hard material layer has said peripheral flange, and said peripheral flange extends outwardly and integrally from an outer peripheral edge of said hard material connecting surface.

19. The protective case as claimed in claim 11, wherein said button hole is defined by a hole-defining wall, and at least one of said soft material layer and said hard material layer further has at least one connecting slot formed in an outer peripheral surface thereof and abutting against said hole-defining wall.

20. The protective case as claimed in claim 11, wherein said hard material layer has a color different from that of said soft material layer.

* * * * *